United States Patent [19]

Nakamura

[11] Patent Number: 4,935,461

[45] Date of Patent: Jun. 19, 1990

[54] AQUEOUS MARKING PEN INK FOR WRITING BOARDS

[75] Inventor: Hiroyuki Nakamura, Mie, Japan

[73] Assignee: Pilot Ink Co., Ltd., Aichi, Japan

[21] Appl. No.: 363,690

[22] Filed: Jun. 9, 1989

[30] Foreign Application Priority Data

Jun. 9, 1988 [JP] Japan ................. 63-142664

[51] Int. Cl.$^5$ ............................... C08K 5/10
[52] U.S. Cl. ........................ 524/306; 524/308; 524/292; 524/317; 523/160
[58] Field of Search ............. 524/306, 308, 292, 317; 523/160

[56] References Cited

U.S. PATENT DOCUMENTS

| | | |
|---|---|---|
| 4,097,289 | 6/1978 | Hofmann et al. ............... 106/26 |
| 4,163,675 | 8/1979 | Hirano et al. ............... 106/22 |
| 4,297,260 | 10/1981 | Feree, Jr. et al. ............... 523/161 |
| 4,525,216 | 6/1985 | Nakanishi ............... 106/30 |
| 4,740,549 | 4/1988 | Okuzomo et al. ............... 524/379 |

*Primary Examiner*—Joseph L. Schofer
*Assistant Examiner*—John J. Guarriello
*Attorney, Agent, or Firm*—Sughrue, Mion, Zinn, Macpeak & Seas

[57] ABSTRACT

An aqueous marking pen ink for writing boards comprising an aqueous vehicle containing a resin, an ester compound and a pigment dispersed in said aqueous vehicle, said resin being selected from the group consisting of the specific polymers and said ester compound being selected from the group consisting of the specific compounds. The marking pen produces writings or markings which are easily erased with dry erasers.

4 Claims, No Drawings

AQUEOUS MARKING PEN INK FOR WRITING BOARDS

FIELD OF THE INVENTION

The present invention relates to an aqueous marking pen ink for writing boards. More particularly, the present invention relates to an aqueous marking pen ink for writing boards which produces writings or markings which are easily erased with erasers such as cloth, soft paper, etc.

BACKGROUND OF THE INVENTION

Heretofore, many proposals have been made concerning this sort of marking ink for writing boards (e.g., inventions disclosed in U.S. Pat. No. 4,097,289 and DE-PS 2,512,734). However, all of these use highly volatile organic solvents, and therefore they have smells at the time of use and in addition present the problem of safety.

SUMMARY OF THE INVENTION

It is an object of the present invention to provide an aqueous marking pen ink which gives on the surface of writing boards writings that can be easily erased with a dry eraser.

The aqueous marking pen ink for writing boards of the present invention comprising an aqueous vehicle containing a resin, an ester compound and a pigment dispersed in said aqueous vehicle, said resin being selected from the group consisting of polyvinyl acetate, polyvinyl formal, polyvinyl acetal, polyvinyl alcohol, partially saponified polyvinyl acetate, vinyl acetate-vinyl alcohol - acrylic acid ester copolymer and vinyl acetate - vinyl alcohol - methacrylic acid ester copolymer, and said ester compound being selected from the group consisting of the compounds represented by formulas (1), (2) and (3):

$$R\text{-}(OCH_2CHR_1)_nOOC\text{-}X\text{-}COO(CHR_1CHR_2O)_nR \quad (1)$$

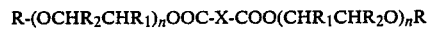

$$R'COO\text{-}(CHR_1CHR_2O)_nR \quad (2)$$

$$R''COO\text{-}(CHR_1CHR_2O)_nOCR \quad (3)$$

wherein X represents an alkylene group having 1 to 34 carbon atoms, alkenylene group having 2 to 34 carbon atoms or phenylene group; $R_1$ and $R_2$ each represents hydrogen atom or methyl group; R represents an alkyl group having 1 to 30 carbon atoms or an aryl group having 6 to 30 carbon atoms; R' represents an alkyl group or a hydroxyalkyl group having 5 to 29 carbon atoms; R" represents an alkyl group or a hydroxyalkyl group having 1 to 29 carbon atoms; and n represents a number of 1 to 20.

DETAILED DESCRIPTION OF THE INVENTION

In general formula (1), —OOC—X—COO— represents a residue of dicarboxylic acids having 3 to 36 carbon atoms, particularly those which include malonic acid, succinic acid, glutaric acid, adipic acid, pimelic acid, suberic acid, azelaic acid, sebacic acid, decanedicarboxylic acid, undecanedicarboxylic acid, dodecanedicarboxylic acid, tetradecanedicarboxylic acid, hexadecanedicarboxylic acid, octadecanedicarboxylic acid, eicosanedicarboxylic acid, fumaric acid, maleic acid, malic acid, tartaric acid and phthalic acid.

In general formula (2), R'CO represents an acryl or hydroxylated acyl group having 6 to 30 carbon atoms.

And in general formula (3), R"CO represents an acyl or hydroxylated acyl group having 2 to 30 carbon atoms. These acyl groups include caproyl, capryloyl, caprinoyl, lauroyl, myristroyl, palmitoyl, stearoyl, arachoyl, behenoyl, montanoyl, oleoyl, erucoyl, linolenoyl, linoloyl, ricinoloyl, isocaprinoyl, isolauroyl, isomyristroyl, isopalmitoyl, isostearoyl, isoarachoyl and oxystearoyl.

The resins are used in the amounts of from 0.1 to 20% by weight, preferably from 1 to 6% by weight, of the ink composition.

The ester compounds are used in the ink composition in amounts of from 0.5 to 20% by weight, preferably from 2 to 10% by weight. In the system where the amounts are not more than 0.5% by weight, the writings on the surface of writing boards cannot be erased sufficiently. On the other hand, in the system where the amounts exceed 20% by weight, the viscosity of the ink increases and the dissolved or dispersed state of the ester compounds becomes unstable thereby defiling the surface of writing boards.

The pigments are those which are generally used in printing inks and marking inks, which include organic pigments such as azos, anthraquinones, condensed polyazos, thioindigos, metal complexes, phtholocyanines, perylenes, dioxazines and quinacridones and inorganic pigments such as carbon black and iron oxide, which are used in the ink composition in amounts of from 0.5 to 20% by weight, preferably from 1 to 10% by weight.

When necessary, surfactants may be used which increases the wettability of the ink to the surface of writing boards or helps the aforementioned ester compounds to be emulsified or solubilized in the vehicle of the ink in a stable manner. The examples of the surfactants include anion surfactants such as salts of alkylsulfuric acid ester, salts of fatty acids, alkylbenzene sulfonates, alkyl naphthalene sulfonates, alkyl phosphate, polyoxyethylene alkylaryl esters of sufuric acid, salts of polycarboxylic acids, formalin condensates of naphthalene sulfonic acid, nonionic surfactants such as polyoxyethylene alkyl ethers, polyoxyethylene esters of fatty acids, polyoxyethylene sorbitan esters of fatty acids, gylcerine esters of fatty acids, polyoxyethylene alkylaryl ethers, polyoxyethylene derivative acetylene alcohol ethylene oxide adducts, fatty acid alkanolamides, fatty acid alkylolamide ethylene oxide adducts, cationic surfactants such as salts of alkylamines, quaternary ammonium salts, alkylbetaines, amine oxides and alkylimidazolins, amphoteric surfactants, silicon-based surfactants such as polyether-modified silicones and alcohol-modified silicones, and fluorine-based surfactants such as perfluoroalkylsulfonates and polyoxyethylene perfluoroethers. These are used in the ink composition in amounts of from 0.01 to 10% by weight, preferably from 0.5 to 3% by weight.

Although water constitutes 50% by weight or more of the solvents, other hydrophilic organic solvents may be used, as necessary, which include lower alcohols such as ethanol and propanol, to accelerate the drying of the writings and, as a moisture-retaining agent, glycols such as ethylene glycol, propylene glycol, diethylene glycol, polyethylene glycol, etc., glycol ethers such as ethylene glycol monomethylether, propylene glycol monomethylether, diethylene glycol monobutylether, etc., glycerine 2-pyrrolidone, N-methyl-2-pyrrolidone, dimethylimidazolidinone, dimethylsufoxide, γ-butylolactone, etc.

In addition to the above additives, other additives can also be used which include antiseptics, rust preventives, defoaming agents, pH adjusting agents, etc.

The abovementioned ester compounds contain in the molecule hydrophilic portions and hydrophobic portions, and are therefore present in a stable manner in the aqueous ink either by themselves or aided by the actions of resins, surfactants or hydrophilic organic solvents. And, the writing produced by the marking pen ink for writing boards of the present invention can be easily erased by a lightly rubbing action with a dry eraser owing to the synergetic action of the resins and the above ester compounds.

The present invention will be explained in detail by way of the following examples but the present invention is not to be construed as being limited thereto.

EXAMPLES 1~8 and COMPARATIVE EXAMPLES 1~4

The inks of Examples 1~8 and Comparative Examples 1~4 were prepared using the materials and proportions indicated in Table 1 in the following manner.

and the inks were obtained by further agitation of one hour.

Ink of Comparative Example 1

The ink was prepared as in Example 1 except that water was used in place of the ester compound in the equivalent amount.

Ink of Comparative Example 2

The ink was prepared as in Example 2 except that a water soluble acrylic resin was used in place of the polyvinyl alcohol.

Ink of Comparative Example 3

The ink was prepared as in Example 3 except that polyvinyl pyrrolidone was used in place of the polyvinyl alcohol.

Ink of Comparative Example 4

The ink was prepared as in Example 4 except that water was used in palce of the ester compound in the equivalent amount.

TABLE 1

| | | Composition of Inks (numerical values of compositions indicate parts by weight) | | | | | | | | | | |
|---|---|---|---|---|---|---|---|---|---|---|---|---|
| | | Examples | | | | | | | | Comparative Examples | | | |
| Raw Material | No. | 1 | 2 | 3 | 4 | 5 | 6 | 7 | 8 | 1 | 2 | 3 | 4 |
| (pigment paste) Black paste | ① | 30.0 | | | | | | | | | | 30.0 | 30.0 |
| Red paste | ② | | | 20.0 | | | | | | | | | 20.0 |
| Blue paste | ③ | | 15.0 | | | 15.0 | | | | | 15.0 | | |
| Black paste | ④ | | | 8.0 | | 8.0 | | 8.0 | | | | 8.0 | |
| Resins | ⑤ | 1.0 | | | | | | | | 1.0 | | | |
| | ⑥ | | 2.0 | | 1.0 | | | | | | | | 1.0 |
| | ⑦ | | | | | | | 5.0 | | | | | |
| | ⑧ | | | | | 8.0 | 8.0 | | | | | | |
| | ⑨ | | | 2.5 | | | | | | | | | |
| | ⑩ | | | | | | | | 2.0 | | | | |
| | ⑪ | | | | | | | | | | | 2.5 | |
| | ⑫ | | | | | | | | | | 6.0 | | |
| Ester Compounds | ⑬ | | 4.0 | | | | | | | | | 4.0 | |
| | ⑭ | 6.0 | | | | | | | | | | | |
| | ⑮ | | | | 5.0 | | | | | | | | |
| | ⑯ | | | | 5.0 | | | | | | | | |
| | ⑰ | | | | | | | 5.0 | | | | | |
| | ⑱ | | | | | 4.0 | | | | | | | |
| | ⑲ | | | 5.0 | | | | | | | | 5.0 | |
| | ⑳ | | | | | | 5.0 | | | | | | |
| Surfactants | ㉑ | | | | | 1.0 | | 1.0 | | | | | |
| | ㉒ | | | 1.2 | | | | | | | | 1.2 | |
| | ㉓ | | | | | | | | 1.0 | | | | |
| | ㉔ | | | | | 1.0 | | | | | | | 1.0 |
| Triethanolamine | | | | | | 0.3 | | | | | | | 0.3 |
| Ethanol | | 20.0 | 15.0 | 20.0 | 15.0 | 15.0 | 15.0 | 20.0 | 30.0 | 20.0 | 15.0 | 20.0 | 15.0 |
| Water | | 43.0 | 64.0 | 63.3 | 57.7 | 64.0 | 57.0 | 61.0 | 32.0 | 49.0 | 60.0 | 63.3 | 62.7 |

Inks of Examples 1 to 4

Predetermined amounts of resins and water were weighed out and mixed. The mixtures were heated for 2 hrs with agitation at about 80° C. to prepare the aqueous solutions of the resins. After the cooling of the aqueous solutions of resins, pigment pastes were added thereto and the mixtures were agitated for one hour by using a dissolver. To the mixtures the ester compounds, surfactants, ethanol and other additives were added, and the inks were obtained by further agitation of one hour.

Inks of Examples 5 to 8

The mixtures of predetermined amounts of resins, pigment pastes and water were agitated for one hour by using a dissolver. To the mixtures the ester compounds, surfactants, ethanol and other additives were added, Explanation on the raw materials listed in Table 1 (by referring to note No.)

(1) A water-based paste consisting of 8% by weight of carbon black (C.I. Pigment % unless otherwise indicated) and 4% by weight of polyvinyl alcohol (hereinafter all percents are by weight unless otherwise indicatred)

(2) A water-based paste consisting of 14% of quinacridone red E (C.I. Pigment Red 209) and 12% of polyvinyl acetal (3) A water-based paste consisting of 20% of indanthrone blue (C.I. Pigment Blue 60) and 4% of an anionic surfactant (4) A water-based paste consisting of 35% of carbon black (C.I. Pigment Black 7) and 5% of a nonionic surfactant (5) Partially saponified polyvinyl acetate (degree of saponification: about 60 mole %; degree of polymerization: 100–600)

(6) Polyvinyl alcohol (degree of saponification: 78.5–81.5 mole %; degree of polymerization: not greater than 1,000)

(7) A 20% aqueous solution of vinyl acetate-vinyl alcohol-acrylate copolymer (8) A 25% aqueous solution of polyvinyl acetal (Eslec W 201, trademark of Sekisui Chemical Co., Ltd.)

(9) Polyvinyl alcohol (degree of saponification: 83-87 mole %; degree of polymerization: 100)

(10) A 50% polyvinyl acetate solution in ethanol

(11) Polyvinyl pyrrolidone K-17 (molecular weight: 12,000)

(12) A 34% aqueous solution of styrene-acrylic acid copolymer (molecular weight: 7,000)

(13)-(17) Ester compounds

Bis(polyalkylene glycol ether) dicarboxylates having groups or values as given in Table 2 for X, R, $R_1$, $R_2$ and n in the aforenamed general formula(1)

TABLE 2

| Ester | X | R | $R_1$ | $R_2$ | n |
|---|---|---|---|---|---|
| (13) | CH=CH | $CH_3$ | $CH_3$ | H | 2 |
| (14) | $(CH_2)_2$ | $CH_3$ | H | H | 3 |
| (15) | $(CH_2)_4$ | $C_3H_7$ | H | H | 2 |
| (16) | $(CH_2)_8$ | $CH_3$ | $CH_3$ | H | 2 |
| (17) | 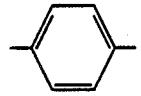 | $CH_3$ | $CH_3$ | H | 2 |

(18)-(19) Ester compounds

Fatty acid esters of polyalkylene glycol ether having groups or values as given in Table 3 for R'CO, $R_1$, $R_2$, R and n in the aforenamed general formula (2)

TABLE 3

| Ester | R'CO | $R_1$ | $R_2$ | R | n |
|---|---|---|---|---|---|
| (18) | $C_{17}H_{35}CO$ | $CH_3$ | H | $C_4H_9$ | 2 |
| (19) | 12-hydroxystearoyl | H | H | $C_4H_9$ | 1 |

(20) Ester compound

Fatty acid diester of polyalkylene glycol having groups or Value as given in Table 4 for R"CO, $R_1$, $R_2$ and n in the aforenamed general formula (2)

TABLE 4

| Ester | R"CO | $R_1$ | $R_2$ | n |
|---|---|---|---|---|
| (20) | $C_7H_{15}CO$ | H | H | 10 |

(21) Sorbitan trioleate
(22) Polyethylene glycol monooleate
(23) Polyoxyethylene nonylphenol ether
(24) Polyoxyethylene alkylphenol ether acidic phosphate Test on the Performance (Erasability of Writings) of the Inks A marking pen was filled with each of the inks prepared above. Predetermined lines were drawn with each pen on a writing board coated with a thermosetting acrylic silicone paint and on a porcelain enameled writing board. Immediately after the drawing and also after a lapse of time (one week), the erasability of the lines was evaluated. For the erasability, the state of the surface was observed after 5 rubs thereof with a piece of dry cloth under the load of 100 g. The results are shown in Table 5.

The rating symbols in the table denote as follows:

○—almost perfectly erased
Δ—writing slightly remain
×—hardly erased

TABLE 5

| | Test Results | | | |
|---|---|---|---|---|
| | Erasability immediately after drawing | | Erasability after lapse of time | |
| Sample | Painted board | Porcelain enameled board | Painted board | Porcelain enameled board |
| Example (1) | ○ | ○ | ○ | ○ |
| Example (2) | ○ | ○ | ○ | ○ |
| Example (3) | ○ | ○ | ○ | ○ |
| Example (4) | ○ | ○ | ○ | ○ |
| Example (5) | ○ | ○ | ○ | ○ |
| Example (6) | ○ | ○ | ○ | ○ |
| Example (7) | ○ | ○ | ○ | ○ |
| Example (8) | ○ | ○ | ○ | ○ |
| Comparative Example (1) | X | X | X | X |
| Comparative Example (2) | X | X | X | X |
| Comparative Example (3) | Δ | Δ | X | Δ |
| Comparative Example (4) | X | X | X | X |

The marking pen ink for writing boards of the present invention has high practicality because it has no smell in comparison with organic solvent type inks for writing boards and because it provides erasability, which is a primary performance, of not only the writings right after drawing but also of those left for a period of time, as illustrated in Table 5.

What is claimed is:

1. An aqueous marking pen ink for writing boards comprising 1 to 6% by weight of a resin, 2 to 10% by weight of an ester compound and 1 to 10% by weight of a pigment dispersed in an aqueous vehicle, said resin being selected from the group consisting of polyvinyl acetate, polyvinyl formal, polyvinyl acetal, polyvinyl alcohol, partially saponified polyvinyl acetate, vinyl acetate - vinyl alcohol - acrylic acid ester copolymer and vinyl acetate - vinyl alcohol - methacrylic acid ester copolymer, and said ester compound being selected from the group consisting of the compounds represented by formula (I):

R-(OCHR$_2$CHR$_1$)$_n$OOC-X-COO(CHR$_1$CHR$_2$O)$_n$R   (1)

wherein X represents an alkylene gorup having 1 to 34 carbon atoms, alkenylene group having 2 to 34 carbon atoms or phenylene group; $R_1$ and $R_2$ each represents a hydrogen atom or a methyl group; R represents an alkyl group having 1 to 30 carbon atoms or an aryl group having 6 to 30 carbon atoms; and n represents a number of 1 to 20.

2. An aqueous marking pen ink according to claim 1, wherein said ink further comprises 0.01 to 10% by weight, based on the total weight of the ink, of additives selected from the group consisting of surface active agents, preservatives and pH - adjusting agents.

3. An aqueous marking pen ink according to claim 1, wherein a liquid component of said aqueous vehicle consists of more than 50% by weight of water with the balance being ethanol or propanol.

4. An aqueous marking pen ink according to claim 1, wherein said resin is polyvinyl acetal and said ester compound is bis(polyalkylene glycol ether) adipate.

* * * * *